US012169045B2

(12) United States Patent
Park et al.

(10) Patent No.: US 12,169,045 B2
(45) Date of Patent: Dec. 17, 2024

(54) CONDENSATE TRAP APPARATUS AND BUOYANT BODY THEREFOR

(71) Applicant: KYUNGDONG NAVIEN CO., LTD., Pyeongtaek-si (KR)

(72) Inventors: Jun Kyu Park, Seoul (KR); Hyun Tak Woo, Seoul (KR)

(73) Assignee: KYUNGDONG NAVIEN CO., LTD., Pyeongtaek-si (KR)

( * ) Notice: Subject to any disclaimer, the term of this patent is extended or adjusted under 35 U.S.C. 154(b) by 360 days.

(21) Appl. No.: 17/605,797

(22) PCT Filed: Mar. 20, 2020

(86) PCT No.: PCT/KR2020/003853
§ 371 (c)(1),
(2) Date: Apr. 6, 2022

(87) PCT Pub. No.: WO2020/226279
PCT Pub. Date: Nov. 12, 2020

(65) Prior Publication Data
US 2022/0316654 A1 Oct. 6, 2022

(30) Foreign Application Priority Data

May 3, 2019 (KR) .................. 10-2019-0052468

(51) Int. Cl.
*F16T 1/20* (2006.01)
*F24H 8/00* (2022.01)

(52) U.S. Cl.
CPC ................ *F16T 1/20* (2013.01); *F24H 8/006* (2013.01)

(58) Field of Classification Search
CPC ..... F16T 1/20; F16T 1/22; F16T 1/383; Y10T 137/3068; Y10T 137/309; Y10T 137/053;
(Continued)

(56) References Cited

U.S. PATENT DOCUMENTS 245,318 A * 8/1881 Rodertson ................. E03D 1/22
137/429
565,457 A * 8/1896 Harttert ..................... F16T 1/24
137/419

(Continued)

FOREIGN PATENT DOCUMENTS

CN 87208192 U 6/1988
CN 1730851 A 2/2006
(Continued)

OTHER PUBLICATIONS

International Search Report and Written Opinion received in International Application No. PCT/KR2020/003853.
(Continued)

*Primary Examiner* — Craig J Price
(74) *Attorney, Agent, or Firm* — ALG Intellectual Property, LLC

(57) ABSTRACT

A condensate trap apparatus according to the present invention comprises: an inlet hole for inflowing a condensate; a storage space for storing the condensate introduced from the inlet hole; an outlet unit including a discharge hole for discharging the stored condensate from the storage space; and a buoyant body including a closing portion which is convex vertically downward so as to close the discharge hole by being seated on the outlet unit, and a support of a pillar type extending vertically upward from the closing portion.

15 Claims, 7 Drawing Sheets

(58) Field of Classification Search
CPC ......... Y10T 137/0753; Y10T 137/0777; Y10T 137/0874; Y10T 137/3071; Y10T 137/3096; Y10T 137/3099; Y10T 137/6004; Y10T 137/7358; Y10T 137/7423; Y10T 137/7426; Y10T 137/86324; Y10T 137/86332; F24H 8/006; F24H 1/36; F24H 9/1836; F24H 9/16; F24H 9/2035; F24H 9/0031; F24H 9/186; F24H 9/20; F24H 9/2042; F24H 9/02; F24H 9/0026; F24H 1/287; F24H 2/18; F24H 1/181; F23C 9/06; F23C 9/08; F23C 202/50; F23C 2700/023; F23D 11/24; F23D 11/106; F23N 5/10; F23N 1/002; F23N 2241/04; F23J 11/00; F23L 13/02; F23L 5/02; F23K 5/142; F23K 2300/206; F16D 3/04; Y02B 30/00; C02F 2209/40; C02F 2209/42; F16K 33/00; F16K 24/04–06; F16K 31/18–34; F16K 24/06; F16K 27/07; B60K 15/035; B60K 15/03504; B60K 15/03519; B60K 15/03289; F16L 47/02; F16L 47/14; F02M 37/017; F02M 37/0076
USPC ..... 137/15.26, 38, 39, 43, 315.08, 409, 429, 137/430, 587, 588; 251/359–365; 277/648; 220/86.2, 745, 746; 141/59, 141/198, 202, 229; 123/516, 518, 198 D, 123/520
See application file for complete search history.

(56) References Cited

U.S. PATENT DOCUMENTS

| | | | | |
|---|---|---|---|---|
| 635,703 | A * | 10/1899 | St. Mary | F16T 1/24 137/329.02 |
| 755,251 | A * | 3/1904 | Steinmitz | F16T 1/24 137/398 |
| 764,933 | A * | 7/1904 | Engelhard et al. | F16K 33/00 73/322.5 |
| 787,504 | A * | 4/1905 | Engelhard et al. | F16K 33/00 73/322.5 |
| 918,272 | A * | 4/1909 | Brennan | F24D 19/081 137/176 |
| 1,039,621 | A * | 9/1912 | Westcott | F16T 1/24 137/445 |
| 1,102,768 | A * | 7/1914 | Leuthesser | F24D 19/081 137/176 |
| 1,334,079 | A * | 3/1920 | Callicott | F16T 1/22 137/193 |
| 1,448,972 | A * | 3/1923 | Long | F16T 1/22 251/118 |
| 1,732,222 | A * | 10/1929 | Cantrall | B01D 17/0214 137/433 |
| 1,750,489 | A * | 3/1930 | Pippin | B01D 17/0214 210/123 |
| 1,995,742 | A * | 3/1935 | Linnmann, Jr. | B01D 17/0214 210/114 |
| 2,029,163 | A * | 1/1936 | Giovenale | F16K 24/042 251/44 |
| 2,043,074 | A * | 6/1936 | Simpson | F16T 1/22 236/53 |
| 2,170,247 | A * | 8/1939 | Lambert | B01D 17/0214 210/114 |
| 2,409,220 | A * | 10/1946 | Melichar | F16K 15/042 251/332 |
| 2,413,430 | A * | 12/1946 | Boone | F02M 1/00 210/114 |
| 2,935,990 | A * | 5/1960 | Biddle | F16K 24/046 137/202 |
| 3,454,005 | A * | 7/1969 | Eubanks | A61M 16/0808 128/205.12 |
| 3,685,655 | A * | 8/1972 | Muller | B01D 36/006 210/114 |
| 3,715,863 | A * | 2/1973 | Zanoni | F04C 15/0053 96/212 |
| 4,132,238 | A * | 1/1979 | Clark | B01D 17/0214 137/433 |
| 4,136,009 | A * | 1/1979 | Samiran | B01D 50/20 210/114 |
| 4,529,122 | A * | 7/1985 | Morgan | F16T 1/10 236/52 |
| 4,742,842 | A * | 5/1988 | Garneau | F24D 3/1008 137/172 |
| 4,905,726 | A * | 3/1990 | Kasugai | B60K 15/03519 137/433 |
| 5,115,798 | A * | 5/1992 | Moore, Jr. | F24H 8/006 126/110 R |
| 5,769,911 | A * | 6/1998 | Van De Vijvere | F16T 1/22 55/432 |
| 6,145,533 | A * | 11/2000 | Perkins | F16K 24/048 137/202 |
| 6,167,587 | B1 * | 1/2001 | Kasper | A47L 11/34 15/389 |
| 6,425,408 | B1 * | 7/2002 | Engle | B67D 7/365 134/169 R |
| 7,013,907 | B2 * | 3/2006 | Ryabtsev | F16K 24/044 137/198 |
| 7,112,308 | B2 * | 9/2006 | Smith | C01B 17/021 96/155 |
| 9,216,372 | B1 * | 12/2015 | Smith | B01D 46/0039 |
| 9,522,346 | B2 * | 12/2016 | Forbes | B01D 19/0063 |
| 9,776,474 | B2 | 10/2017 | Kume et al. | |
| 10,675,561 | B2 * | 6/2020 | Forbes | C01B 17/021 |
| 10,967,733 | B2 * | 4/2021 | Sugiyama | F16K 31/28 |
| 2003/0098061 | A1 * | 5/2003 | Stuchlik, III | F16T 1/22 137/192 |
| 2007/0137706 | A1 | 6/2007 | Stamatakis et al. | |
| 2013/0118608 | A1 | 5/2013 | Holiday | |
| 2013/0247763 | A1 * | 9/2013 | Forbes | B01D 19/0063 96/168 |
| 2013/0292488 | A1 * | 11/2013 | Jeuffe | B60S 1/48 239/127 |
| 2016/0001637 | A1 | 1/2016 | Kume | |

FOREIGN PATENT DOCUMENTS

| | | |
|---|---|---|
| CN | 204006701 U | 12/2014 |
| EP | 2960088 A1 | 12/2015 |
| GB | 608200 A | 9/1948 |
| JP | 2001200565 A | 7/2001 |
| JP | 2007225146 | 9/2007 |
| JP | 2014184952 | 10/2014 |
| KR | 200176948 | 4/2000 |
| KR | 1020110137119 | 12/2011 |
| KR | 20170047702 A | 5/2017 |
| KR | 101790317 | 10/2017 |
| KR | 1020180058246 | 6/2018 |
| WO | 2016056481 A1 | 4/2016 |

OTHER PUBLICATIONS

"Extended European Search Report for Application No. EP20801550.3, mailed on Aug. 19, 2022".
"First Office Action received in Chinese Patent Application No. 2020800333662 dated Jul. 27, 2022".

* cited by examiner

CONDENSATE TRAP APPARATUS AND BUOYANT BODY THEREFOR

RELATED APPLICATIONS

The present application is a U.S. National Stage Application under 35 U.S.C. § 371 of International Application No. PCT/KR2020/003853, filed on Mar. 20, 2020, which claims priority to Korean Patent Application No. 10-2019-0052468 filed on May 3, 2019, the contents of which are hereby incorporated by reference in their entirety.

TECHNICAL FIELD

The present disclosure relates to a condensate trap apparatus used for a boiler, and a buoyant body therefor.

BACKGROUND ART

To heat heating water of a boiler, a burner that is a heat source exchanges heat with the heating water by heating air. Exhaust gas produced as a result is condensed as a temperature thereof decreases, and a phase of the exhaust gas may be changed into a form of condensate.

The condensate is generally acidic due to components of the exhaust gas, and expedites corrosion of components of the boiler when it is continuously preserved in an interior the boiler. Accordingly, it is necessary to discharge the condensate in an appropriate method.

Meanwhile, while the condensate is discharged in the method, the exhaust gas that has not been condensed but is left in a gaseous state also may be discharged together with the condensate. However, unlike the condensate, because the exhaust gas is diffused into the air while being discharged, it causes serious environmental contamination, and may cause carbon monoxide and carbon dioxide when it is introduced into the interior, and thus may influence the safety of residential environments and life spaces.

Accordingly, to discharge the condensate but not to discharge the exhaust gas, various trap apparatuses have been used in the field of boilers.

DISCLOSURE

Technical Problem

The present disclosure has been made in an effort to solve the above-mentioned problems, and provides a condensate trap apparatus that discharges condensate but does not discharge exhaust gas, and a buoyant body therefor.

Technical Solution

According an embodiment, a condensate trap apparatus includes an inlet, through which condensate is introduced, a storage space, in which the condensate introduced from the inlet is stored, a discharge part including an outlet that discharges the stored condensate from the storage space, and a buoyant body including a closed part formed to be convex toward a vertically lower side such that the buoyant body is seated on the discharge part to close the outlet, and a columnar support part extending vertically upwards from the closed part.

According an embodiment, a buoyant body seated on a discharge part including an outlet configured such that condensate stored in a storage space is discharged from the storage space includes a closed part formed to be convex toward a vertically lower side to be seated on the discharge part to close the outlet, and having a shape of a portion of a sphere, a columnar support part extending from the closed part to a vertically upper side, and having an outer surface that is continuous to an outer surface of the closed part, and a head part disposed at an end of the support part and formed to be convex toward a vertically upper side.

Advantageous Effects

Accordingly, the buoyant body may float better in the condensate, and may discharge the condensate smoothly.

Because the buoyant body floats stably, whereby the buoyant body may be prevented from turning over while an operation of the buoyant body is repeated.

MODE FOR INVENTION

Figure 1:
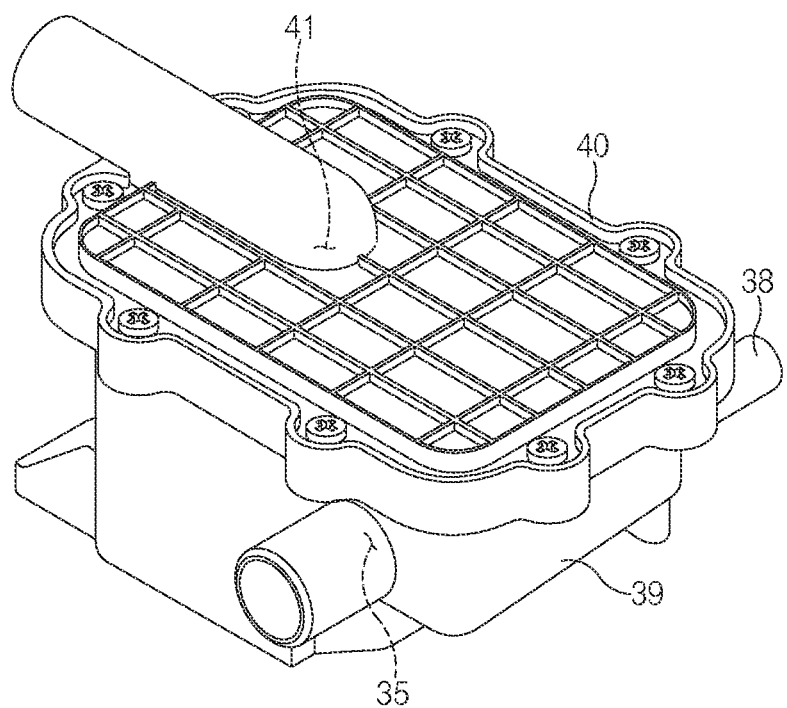
FIG. 1 is a perspective view of a condensate trap apparatus according to an embodiment of the present disclosure.

Hereinafter, some embodiments of the present disclosure will be described in detail with reference to the exemplary drawings. Throughout the specification, it is noted that the same or like reference numerals denote the same or like components even though they are provided in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. The terms are provided only to distinguish the components from other components, and the essences, sequences, orders, and the like of the components are not limited by the terms. When it is described that one element is connected, coupled, or electrically connected to another element, the element may be directly connected or coupled to the other element, but a third element may be connected, coupled, or electrically connected between the elements.

To adjust discharge of condensate, a trap apparatus in a scheme of discharging the condensate only when an outlet blocked by a buoyant body is opened after the condensate passes through a membrane may be considered. In the trap apparatus, when the condensate floats to a specific water level or more, the buoyant body is spaced apart from the outlet to open the outlet so that the condensate is discharged.

However, a pressure in an interior of a body of the trap apparatus increases due to a structure thereof as the trap apparatus is used, and the trap apparatus may be consistently used smoothly only when the pressure is solved by a bypass line.

Hereinafter, a structure of a condensate trap apparatus 1 according to an embodiment of the present disclosure capable of solving the problems will be described with reference to the accompanying drawings.

Figure 2:
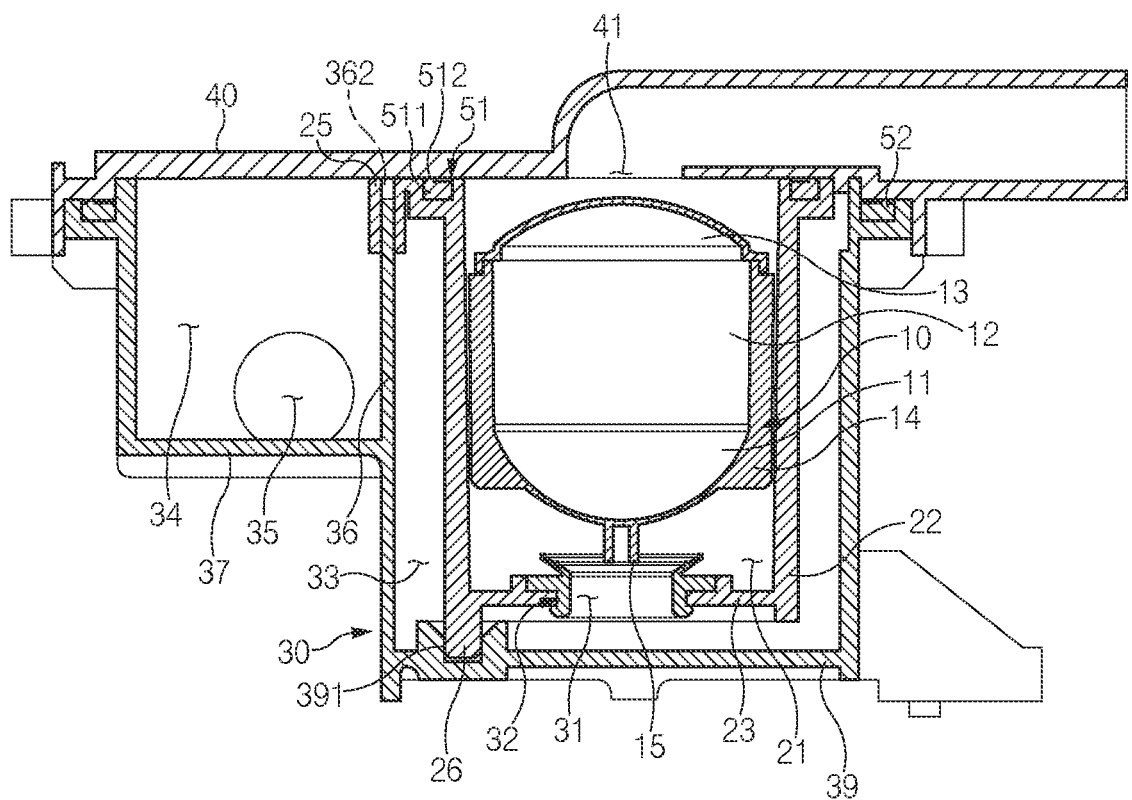
FIG. 2 is a longitudinal sectional view of a condensate trap apparatus according to an embodiment of the present disclosure.
Figure 3:
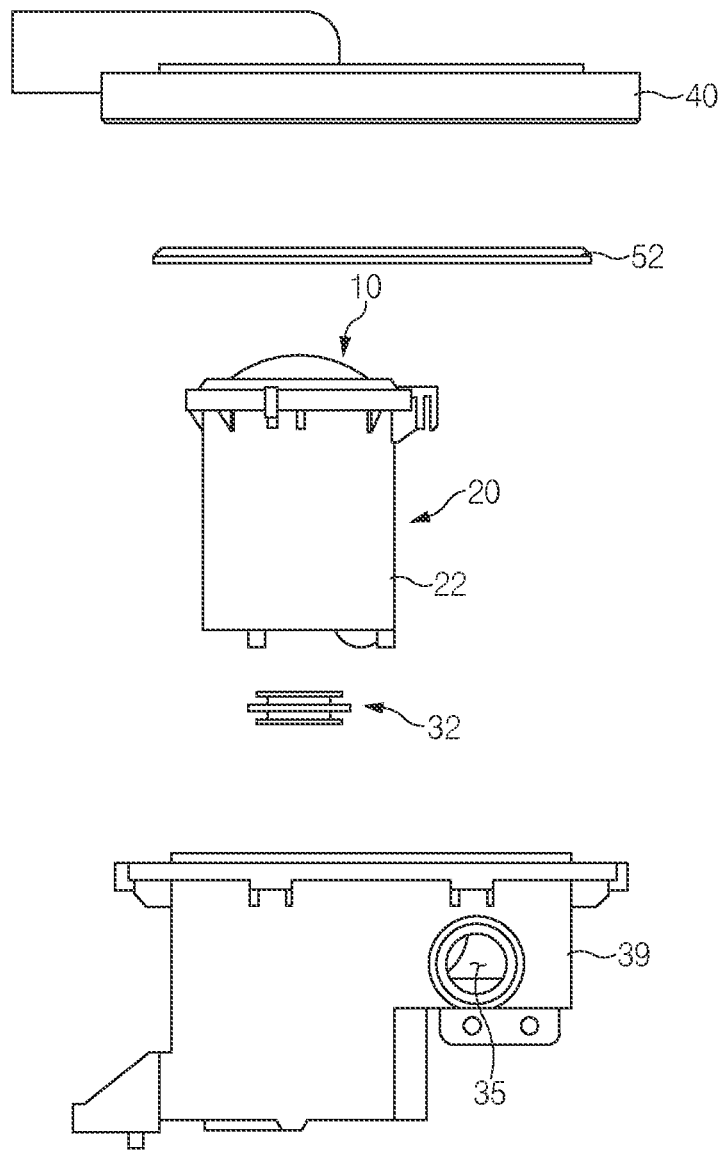
FIG. 3 is an exploded view of a condensate trap apparatus according to an embodiment of the present disclosure.

FIG. 1 is a perspective view of the condensate trap apparatus 1 according to an embodiment of the present disclosure. FIG. 2 is a longitudinal view of the condensate trap apparatus 1 according to the embodiment of the present disclosure. FIG. 3 is an exploded view of the condensate trap apparatus 1 according to the embodiment of the present disclosure.

Referring to FIGS. 1 to 3, the condensate trap apparatus 1 according to the embodiment of the present disclosure may include an inlet 41, a storage space 21, a discharge part 30, and a buoyant body 10, and may further include a cover 40. A plate-shaped cover 40 is covered on a case 39 of the discharge part 30 that functions as an outer wall that surrounds overall elements to constitute an integral housing, and other elements may be accommodated in an interior thereof. A groove may be formed at a circumference of an upper end of the case 39, and an annular case packing 52 may be inserted into the groove. The case packing 52 has a wing structure, and seals an interior of the case 39 when the cover 40 is covered.

In the embodiment of the present disclosure, it is expressed that the case 39 has a three-dimensional shape as if substantially two rectangular parallelepipeds were stuck to each other, but the shape is not limited thereto. In the specification, a vertical direction refers to a height direction of the case 39 illustrated in the drawings. That is, the case 39 may have a shape that is opened in the vertical direction, and the cover 40 may be coupled to an opened portion of the case 39 along the vertical direction to cover the opened portion. A horizontal direction refers to a direction that is perpendicular to the vertical direction.

Inlet 41, Storage Space 21, and Separation Preventing Wall 20

The inlet 41 is an opening, through which the condensate produced by the boiler is introduced, and may be formed at a location, at which an introduction pipeline and the cover 40 are connected to each other, and communicates an interior of the introduction pipeline and the storage space 21. The introduction pipeline is a pipeline configured such that the condensate obtained when exhaust gas of the boiler is condensed in an interior thereof flows therethrough. The condensate that flows in the introduction pipeline is delivered to the storage space 21 through the inlet 41. In the embodiment of the present disclosure, it is illustrated that the inlet 41 is formed in the vertical direction while passing through a portion of the cover 40, but a location of the inlet 41 is not limited thereto.

The storage space 21 is a space that accommodates the condensate introduced from the inlet 41. As the condensate is continuously introduced into the storage space 21, a level of the condensate in the storage space 21 may become gradually higher.

The condensate trap apparatus 1 according to the embodiment of the present disclosure may further include the separation preventing wall 20 that defines the storage space 21. The separation preventing wall 20 is a partition wall that surrounds the buoyant body 10 and of which at least a portion of an inner surface is spaced apart from an outer surface of the buoyant body 10, and extends along the vertical direction and vertically upper and lower sides may be opened. The separation preventing wall 20 may have a uniform height in the vertical direction such that an inside and an outside of the separation preventing wall 20 are not communicated with each other along the horizontal direction that is perpendicular to the vertical direction that is a direction, in which an outlet 31 is opened.

To provide the shape, the separation preventing wall 20 may have a tubular side wall 22. Because the side wall 22 surrounds the buoyant body 10, the buoyant body 10 may elevate due to a buoyant force of the condensate in the vertical direction, but a location of the buoyant body 10 is restricted by the separation preventing wall 20 such that the buoyant body 10 is not separated in another direction that is not parallel to the vertical direction.

A lower wall 23 may be disposed on a lower side of the side wall 22 of the separation preventing wall 20. The lower wall 23 includes a low wall opening that is opened in the vertical direction such that a discharge packing 32 surrounding the outlet 31 is inserted thereinto A fixing boss 26 may be formed in the separation preventing wall 20, and may be coupled to a fixing recess 391 formed at a portion of an inner surface of the case 39. As the fixing boss 26 and the fixing recess 391 are coupled to each other, a relative location of the separation preventing wall 20 and the case 39 may be fixed. In the embodiment of the present disclosure, it is illustrated that the fixing boss 26 protrudes from a lower side of the separation preventing wall 20 toward a vertically lower side and is coupled to the fixing recess 391 formed on, among inner surfaces of the case 39, a surface located on a lower side, but a location and a structure thereof are not limited thereto. For example, the fixing boss may be formed in the case 39 and the fixing recess may be formed in the separation preventing wall 20 to perform the same function.

The separation preventing wall 20 is fixed by the fixing boss 26 and the fixing recess 391 while an outer surface of the separation preventing wall 20 and an inner surface of the case 39 are spaced apart from each other. A first discharge space 33 that is a space formed between the outer surface of the separation preventing wall 20 and the inner surface of the case 39 will be described below in detail in a description of a trap structure of the discharge part 30.

Because the cover 40 is covered, the storage space 21 may be a space defined by the side wall 22 and the lower wall 23 of the separation preventing wall 20, and the cover 40. In this situation, to maintain waterproofness of a border of the side wall 22 and the cover 40, the condensate trap apparatus 1 according to the embodiment of the present disclosure may further include a prevention wall packing 51.

The annular prevention wall packing 51 may be disposed on a vertically upper side of the side wall 22 of the separation preventing wall 20. The prevention wall packing 51 is disposed to prevent the condensate from overflowing to another location of the interior of the condensate trap apparatus 1 as the condensate that is more than an accommodation capacity of the interior space is introduced when the cover 40 covers the separation preventing wall 20. Accordingly, when the cover 40 is covered, the flexible prevention wall packing 51 is disposed between the separation preventing wall 20 and the cover 40, whereby materials are prevented from being introduced and discharged through an aperture between the separation preventing wall 20 and the cover 40.

For the operation, the prevention wall packing 51 includes an annular part 511 inserted into an annular groove formed at an upper end of the side wall 22, and a wing part 512 protruding from the annular part 511 to a radially inner side and a vertically upper side. When being covered by the cover 40, the wing part 512 is elastically deformed to block the above-described aperture while contacting a lower surface of the cover 40.

Because the waterproofness may be maintained even though the separation preventing wall 20 and the cover 40 are not firmly coupled to each other at the border thereof as the prevention wall packing 51 is disposed, a coupling member such as a screw for coupling the corresponding part when the condensate trap apparatus 1 is assembled may not be necessary.

Buoyant Body 10

The buoyant body 10 is an element that may close the outlet 31 when it is seated on the discharge part 30 or open the outlet 31 when it is spaced apart from the discharge part 30 while floating in the condensate. The buoyant body 10 includes a closed part 11, a support part 12, and a head part 13, and may be formed in a shape of an acorn. Although a spherical buoyant body may be considered, the buoyant body of the shape occupies a small volume in the storage space 21 and thus a buoyant force applied by the condensate is small, so that the buoyant body may not float smoothly when a high pressure is applied.

The closed part 11 is a portion of the buoyant body 10 seated on the discharge part 30. The closed part 11 has a shape that is convex toward a vertically lower side, and may close the outlet 31 when it is seated on the discharge packing 32 of the discharge part 30. The closed part 11 may have a shape of a portion of a sphere.

The support part 12 extends from the closed part 11 to a vertically upper side. The support part 12 may have a columnar shape. The support part 12 may have an outer surface that is continuous from an outer surface of the closed part 11. Accordingly, because the support part 12 extends from the closed part 11 of the above-described shape, the support part 12 may have a cylindrical shape.

The head part 13 is a portion of the buoyant body 10 that is disposed at an upper end of the support part 12 and is convex toward the vertically upper side. The head part 13 also may have an outer surface that is continuous from an outer surface of the support part 12, and may have a shape of a portion of a sphere. In the embodiment of the present disclosure, the head part 13 and the support part 12 are expressed to be convex along opposite directions and a radius of curvature of a profile of the head part 13 in a longitudinal section thereof is larger than a radius of curvature of a profile of the closed part, but the shape thereof is not limited thereto.

The buoyant body 10 may further include a guide wing 14. The guide wing 14 is a portion of the buoyant body 10 that prevents the support part 12 from being biased from a state, in which the support part 12 is arranged along the vertical direction, when the support part 12 floats in the condensate or is seated on the discharge packing 32.

The guide wing 14 is an element that protrudes from an outer surface of at least one of the support part 12 or the closed part 11, and an outer end of which is disposed adjacent to the separation preventing wall 20. A plurality of guide wings 14 may be provided to protrude from an outer surface of the support part 12 or the closed part 11 radially or to be spaced apart from each other by a specific interval along a circumference of the support part 12 or the closed part 11. In the embodiment of the present disclosure, a total of four guide wings 14 are provided, but the number of the guide wings 14 is not limited thereto.

The guide wings 14 may extend along a vertical direction. Accordingly, as illustrated, the guide wings 14 may be disposed over both of the support part 12 and the closed part 11. While the guide wing 14 extends along the vertical direction, an outermost surface of the guide wing 14 may have a shape that is parallel to an inner surface of the separation preventing wall 20.

The buoyant body 10 may further include a weight 151 formed of a material having a density that is higher than that of a material constituting the support part 12, at a lower end of the closed part 11. The weight 151 may be disposed at the above-described location as a buoyant body boss 15 protruding from a lower end of the closed part 11 to a vertically lower side is inserted into a recess. Because a density of the weight 151 is higher than a density of the material that constitutes the support part 12, a center of weight of the entire buoyant body 10 may become lower as compared with a case, in which there is no weight 151. Accordingly, the buoyant body 10 may float or be submerged more stably.

The weight 151 may be inserted into the outlet 31 when the buoyant body 10 closes the outlet 31. Accordingly, even when the buoyant body 10 floats and the outlet 31 is opened, a situation, in which the buoyant body 10 is turned over and cannot return to a normal driving location and a normal posture again, may be prevented. A location of the weight 151 may be identified in FIGS. 4 to 6 as follows.

Because the buoyant body 10 has the above-described shape, a higher buoyant force is applied from the condensate to the buoyant body 10 than to a spherical buoyant body, so that the condensate may be discharged as the buoyant body 10 floats more easily under a high pressure. Furthermore, because a support structure is present, the buoyant body 10 may stably move while not causing a problem of overturning even while the buoyant body 10 repeatedly floats or is submerged.

Discharge Part 30

Figure 4:
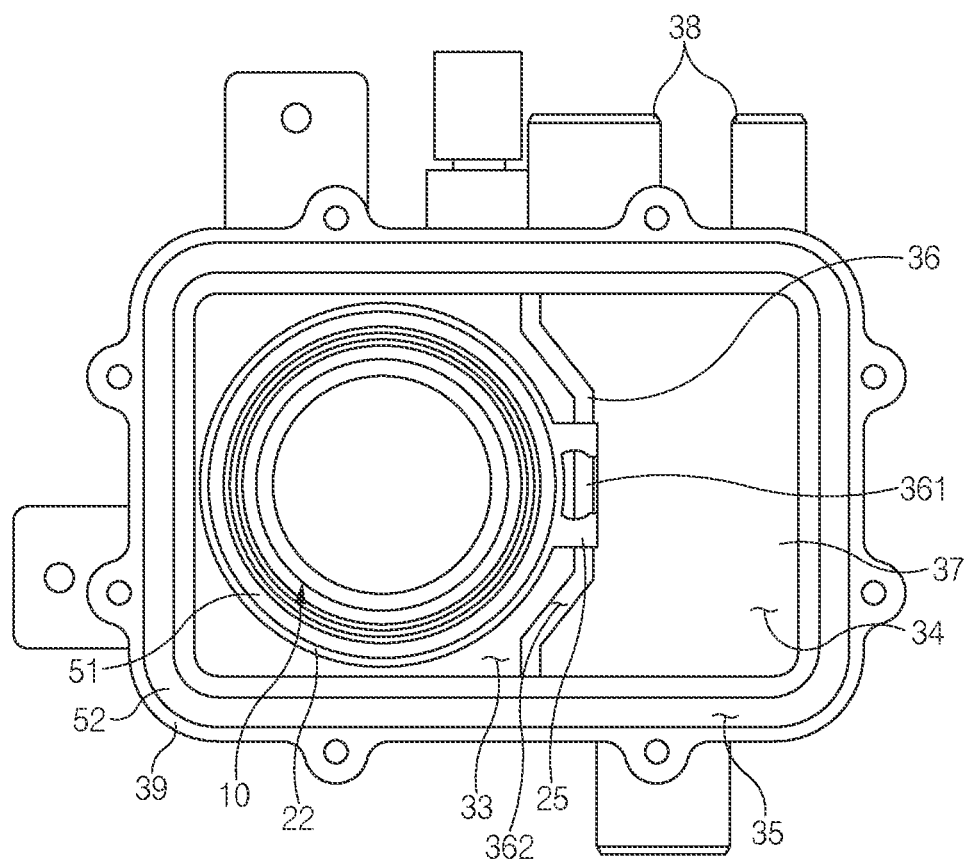
FIG. 4 is a plan view of a condensate trap apparatus according to an embodiment of the present disclosure, in a state in which a cover thereof is removed.
Figure 5:
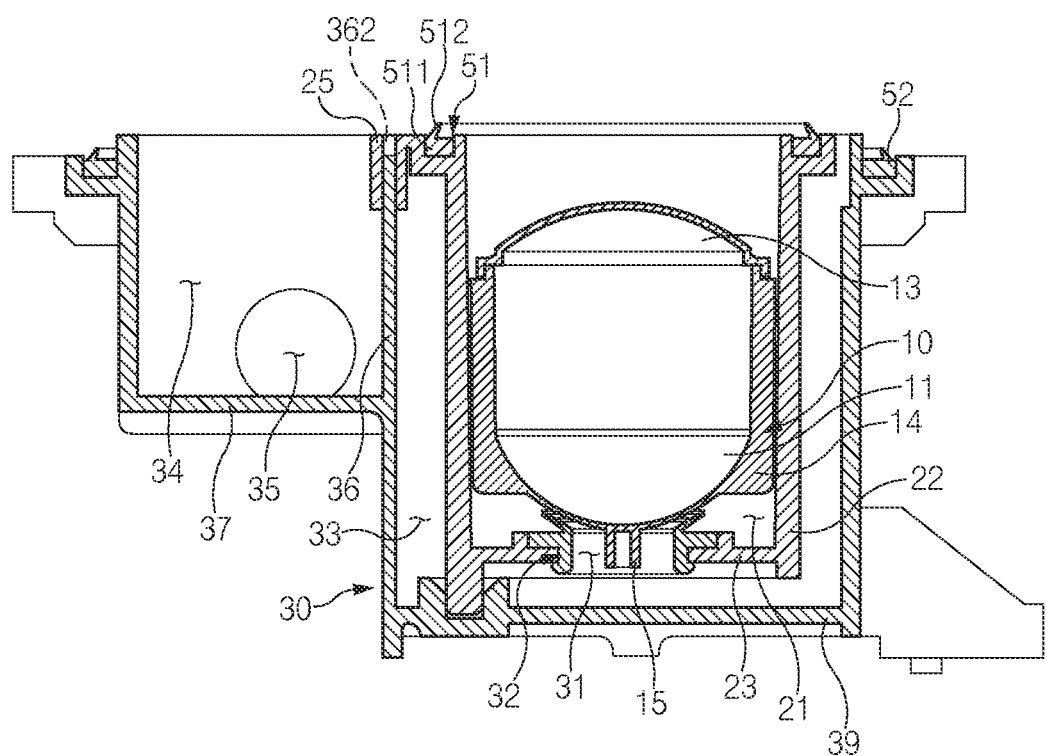
FIG. 5 is a longitudinal sectional view illustrating a situation, in which a buoyant body of a condensate trap apparatus is submerged to be seated on a discharge packing according to an embodiment of the present disclosure.
Figure 6:
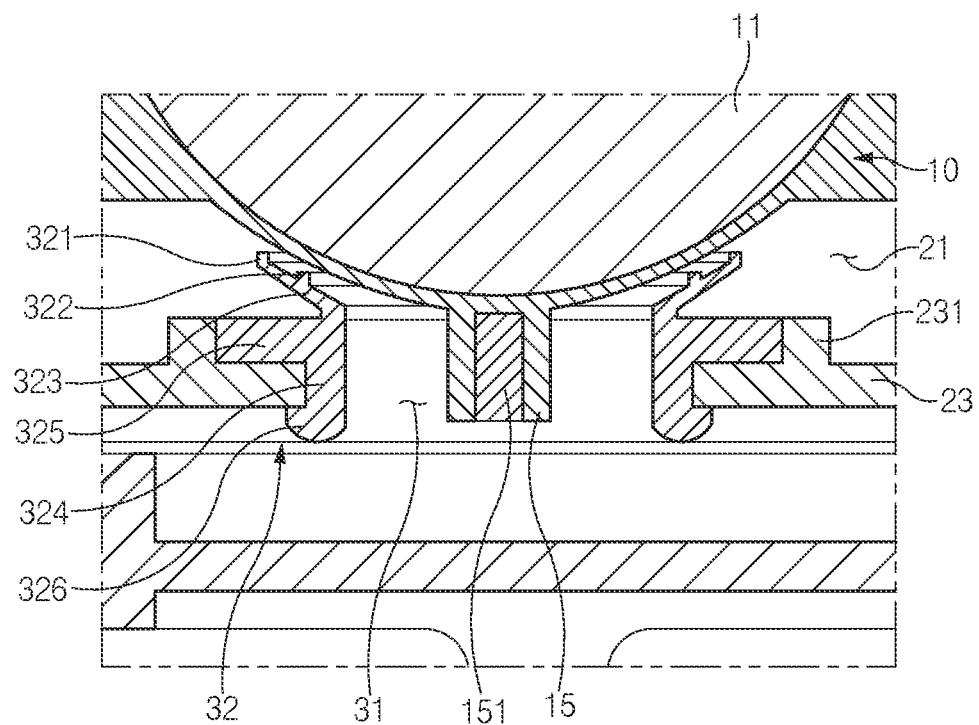
FIG. 6 is an enlarged view illustrating a portion that is adjacent to a buoyant body and a discharge packing.

FIG. 4 is a plan view of the condensate trap apparatus 1 according to an embodiment of the present disclosure, in a state in which the cover 40 thereof is removed. FIG. 5 is a longitudinal sectional view illustrating a situation, in which the buoyant body 10 of the condensate trap apparatus 1 is submerged to be seated on the discharge packing 32 according to an embodiment of the present disclosure. FIG. 6 is an enlarged view illustrating a portion that is adjacent to the buoyant body 10 and the discharge packing 32.

The discharge part 30 will be described with reference to FIGS. 4 to 6. The discharge part 30 is an element including structures that discharge the condensate stored in the storage space 21. The discharge part 30, accordingly, includes the outlet 31 that discharges the condensate from the storage space 21.

The outlet 31 is an opening that is opened in a direction that is perpendicular to a lower wall opening formed in the lower wall 23 of the separation preventing wall 20, and discharges the condensate from the storage space 21 when being opened. In the embodiment of the present disclosure, the outlet 31 communicates the storage space 21 and the first discharge space 33, which will be described below.

The annular discharge packing 32 is disposed to surround the outlet 31. The discharge packing 32 including the discharge part 30 has a part that extends to be inclined toward a radial outer side of the outlet 31 and a vertically upper side. Accordingly, when the buoyant body 10 is seated on the discharge packing 32, an outer surface of the buoyant body 10 contacts the discharge packing 32, whereby the outlet 31 is closed by blocking the condensate that flows to the outlet 31. Furthermore, as the buoyant body 10 floats and is spaced apart from the discharge packing 32, the outlet 31 may be opened.

The discharge packing 32 may be formed of a material having elasticity to contact the buoyant body 10 better and thus maintain the waterproofness. The discharge packing 32 may include an extension part 323 that is a part extending from the outlet 31 to be inclined toward a radial outer side of the outlet 31 and the vertically upper side, a first contact part 321, and a second contact part 322.

The first contact part 321 is a portion that is disposed on an outermost side with respect to a radial direction of the outlet 31 to contact the closed part 11. Because the first contact part 321 is disposed on an outermost side of the extension part 323 with respect to the radial direction, it is disposed at an upper end of the extension part 323 with respect to the vertical direction. The first contact part 321, in a longitudinal sectional view of FIG. 6, may have a cross-section that protrudes from the extension part 323 to a vertically upper side. Accordingly, the buoyant body 10 that is submerged and is seated on the discharge packing 32 may be seated on the first contact part 321.

The second contact part 322 is a portion that is spaced apart from the first contact part 321 with respect to the radial direction, and, like the first contact part 321, has a shape that protrudes from the extension part 323 to the vertically upper side, in a longitudinal section thereof. The second contact part 322 has an annular shape, and contacts the outer surface of the buoyant body 10 when the buoyant body 10 is seated on the discharge packing 32.

The discharge packing 32 may have a waterproof structure of a dual structure including the first contact part 321 and the second contact part 322. Because the discharge packing 32 has the dual structure, the waterproofness of the outlet 31 is maintained better in a state, in which the buoyant body 10 is seated on the discharge packing 32.

The discharge packing 32 may include a packing flange 325, a packing column part 324, and a packing stopper 326. The packing column part 324 that has an annular shape to surround the outlet 31 may be inserted into the lower wall opening to complete assembly of the discharge packing 32. Then, the annular packing stopper 326 disposed at a lower end of the packing column part 324 may have a cross-section that is convex toward a vertically lower side in a longitudinal section thereof such that the packing column part 324 is inserted into the lower wall opening more easily. Accordingly, when the discharge packing 32 is pressed to the vertically lower side in a state, in which the packing stopper 326 contacts the lower wall opening, the discharge packing 32 may be easily inserted.

A diameter of the packing stopper 326 may be larger than a diameter of the packing column part 324. Accordingly, when the discharge packing 32 is pressed to the vertically lower side for assembly, like a snap-fit, the packing stopper 326 may pass through the lower wall opening of the packing stopper 326 and be disposed on the vertically lower side of the lower wall 23. At the same time, the packing column part 324 may be disposed on an inside of the lower wall opening. Because the packing stopper 326 stops the discharge packing 32, the discharge packing 32 may be prevented from being separated upwards.

The packing flange 325 may be formed from the packing column part 324. The packing flange 325 is a portion that protrudes from the packing column part 324 in a radially outer side, and is disposed adjacent to the vertically upper side of the packing column part 324. Accordingly, the packing flange 325 may be seated on an inner side of the lower wall 23 when the discharge packing 32 is assembled. Because the packing flange 325 stops the discharge packing 32, the discharge packing 32 may be prevented from being separated on the vertically lower side. That is, because the lower wall 23 is disposed between the packing stopper 326 and the packing flange 325, the discharge packing 32 may be fixed to the lower wall 23.

Because the outlet 31 and the buoyant body 10 that closes the outlet 31 are disposed immediately after the inlet 41 is disposed, an element that solves a pressure through a bypass is not separately necessary.

The discharge part 30 may further include a "U"-shaped trap. To form the trap, the discharge part 30 may further include the first discharge space 33 and a second discharge space 34.

The first discharge space 33 means a space that accommodates the condensate discharged through the outlet 31. Accordingly, the first discharge space 33 and the storage space 21 may be communicated with each other through the outlet 31.

To allow the first discharge space 33 to accommodate the condensate discharged from the storage space 21, at least a portion of the first discharge space 33 may be disposed on a lower side of the storage space 21. A portion of the first discharge space 33 disposed on the lower side of the storage space 21 may receive the condensate from the storage space 21 and accommodate the condensate.

The first discharge space 33 may surround the separation preventing wall 20. The first discharge space 33 may be a space formed between an outer surface of the separation preventing wall 20 and an inner surface of the case 39. The first discharge space 33 may include a space between the inner surface of the case 39 and the lower wall 23 and a space between the inner surface of the case 39, and a discharge partition wall 36 and the side wall 22. As the level of the condensate accommodated in a space between the inner wall of the case 39 and the lower wall 23 becomes higher after the condensate is delivered to the corresponding space, the condensate may be filled in the space between the inner surface of the case 39, and the discharge partition wall 36 and the side wall 22.

A condensate passage 362, through which the condensate flows out from the first discharge space 33, may be disposed on an upper side of the outlet 31 with respect to the vertical direction. Accordingly, because the condensate is not discharged unless the condensate is filled in the first discharge space 33 to a specific level or more due to the shape of the first discharge space 33, a "U"-shaped trap, in which the exhaust gas is prevented from being discharged by the condensate due to a head, may be further formed. Because the trap by the buoyant body 10 and the "U"-shaped trap are disposed together, the condensate trap apparatus 1 according to the embodiment of the present disclosure may have a safer trap structure.

Because a porous mesh is disposed in the condensate passage 362, it may filter out foreign substances of a specific size or more, which are carried by the condensate that passes through the condensate passage 362.

The second discharge space 34 is a space, in which the condensate delivered from the first discharge space 33 is accommodated. Accordingly, the discharge partition wall 36 that partitions the second discharge space 34 and the first discharge space 33 may be present, and the condensate passage 362 that communicates the first discharge space 33 and the second discharge space 34 to deliver the condensate from the first discharge space 33 to the second discharge space 34 may be formed in the discharge partition wall 36.

The discharge partition wall 36 is formed in the interior of the case 39 to partition the first discharge space 33 and the second discharge space 34. The discharge partition wall 36, as illustrated in FIG. 4, extends along one direction that is perpendicular to the vertical direction, in a cross-section taken on a plane that is perpendicular to the vertical direction, and may have a portion protruding in a direction that becomes farther away from the side wall 22 of the separation preventing wall 20 at a center thereof.

A portion of an upper end of the discharge partition wall 36 may contact the cover 40 when the cover 40 is covered, and another portion of the upper end of the discharge partition wall 36 may be spaced apart from the cover in the vertical direction when the cover 40 is covered to form the condensate passage 362. Among them, a portion that contacts the cover 40 may be a partition wall boss 361.

The partition wall boss 361 is an element formed to stop a prevention wall ring 25 formed on an upper side of the separation preventing wall 20. The partition wall boss 361 has a protruding boss shape due to a difference of a relative height from another portion of the upper end of the discharge partition wall 36, in which the condensate passage 362 is formed. The partition wall boss 361 may be disposed in an area of the discharge partition wall 36 protruding in a direction that becomes farther away from the side wall 22 of the above-described separation preventing wall 20, but a location thereof is not limited thereto.

As illustrated in FIG. 3, the separation preventing wall 20 may be assembled in the case 39 while being moved to the vertically lower side. Then, the partition wall boss 361 is inserted into an opening of the prevention wall ring 25, and the separation preventing wall 20 may be coupled to the discharge partition wall 36, and a relative location thereof may be fixed. However, shapes of the partition wall boss 361 and the prevention wall ring 25 are not limited thereto, and may be modified to a structure, in which they may be coupled to each other.

The second discharge space 34 may be a space defined by the inner surface of the case 39 and the discharge partition wall 36. The condensate delivered to the second discharge space 34 may be discharged to the outside through a drainage 35. The drainage 35 is an opening that communicates the second discharge space 34 and the outside. The drainage 35 may be located on an upper side of the outlet 31 with respect to the vertical direction.

Figure 7:
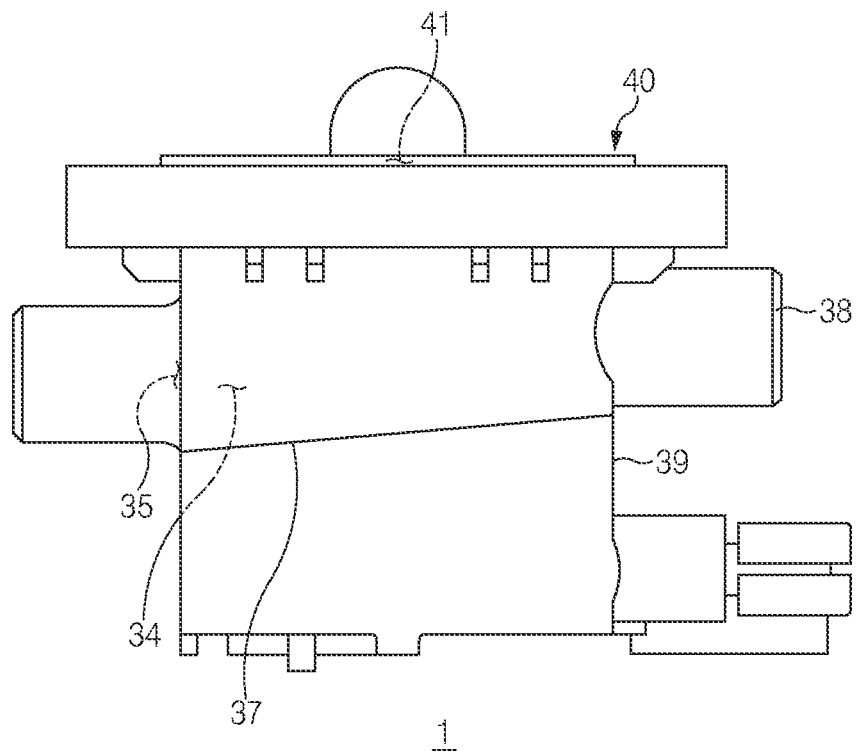
FIG. 7 is a side view of a condensate trap apparatus according to an embodiment of the present disclosure.

FIG. 7 is a side view of the condensate trap apparatus 1 according to an embodiment of the present disclosure. Referring to FIG. 7, the drainage 35 is disposed to be adjacent to a bottom surface of the second discharge space 34, and the condensate delivered to the second discharge space 34 is easily discharged by the drainage 35.

The bottom surface of the second discharge space 34 may have a gradient such that a portion thereof that is adjacent to the drainage 35 is located on a lowermost side with respect to the vertical direction. Accordingly, a wall 37 located on a lower side of the inner surface of the case 39, which defines the second discharge space 34, may be inclined in the vertically upper side as it goes from the drainage 35 in a horizontal direction. According to the gradient, water may be easily discharged through the drainage 35.

An auxiliary line 38 may be further connected to the second discharge space 34. The auxiliary line 38 may include a safety valve line and a drain line that are necessary when the boiler is installed. That is, to deliver other water generated by the boiler that produces the condensate to the second discharge space 34, the lines communicated with the second discharge space 34 become the auxiliary line, but the kinds of the lines included in the auxiliary line are not limited thereto.

Because the auxiliary line 38 is communicated with the second discharge space 34, the water is not discharged to the outside separately by the lines, and the water may be discharged to the outside through one simplified exit, and thus it is easy to manage the discharged water.

A location, at which the auxiliary line 38 is communicated with the second discharge space 34, may be on an upper side of the drainage 35 with respect to the vertical direction. Accordingly, the water is delivered to the second discharge space 34 through the auxiliary line 38, and the water stored in the second discharge space 34 is not discharged through the auxiliary line 38 but may be discharged through the drainage 35.

Although it may have been described until now that all the elements constituting the embodiments of the present disclosure are coupled to one or coupled to be operated, the present disclosure is not essentially limited to the embodiments. That is, without departing from the purpose of the present disclosure, all the elements may be selectively coupled into one or more elements to be operated. Furthermore, because the terms, such as "comprising", "including", or "having" may mean that the corresponding element may be included unless there is a specially contradictory description, it should be construed that another element is not extruded but may be further included. In addition, unless defined otherwise, all terms used herein, including technical or scientific terms, have the same meanings as those generally understood by those skilled in the art to which the present disclosure pertains. The terms, such as the terms defined in dictionaries, which are generally used, should be construed to coincide with the context meanings of the related technologies, and are not construed as ideal or excessively formal meanings unless explicitly defined in the present disclosure.

The above description is a simple exemplification of the technical spirits of the present disclosure, and the present disclosure may be variously corrected and modified by those skilled in the art to which the present disclosure pertains without departing from the essential features of the present disclosure. Accordingly, the embodiments disclosed in the present disclosure is not provided to limit the technical spirits of the present disclosure but provided to describe the present disclosure, and the scope of the technical spirits of the present disclosure is not limited by the embodiments. Accordingly, the technical scope of the present disclosure should be construed by the attached claims, and all the technical spirits within the equivalent ranges fall within the scope of the present disclosure.

The invention claimed is:

1. A condensate trap apparatus comprising:
   an inlet, through which condensate is introduced;
   a storage space, in which the condensate introduced from the inlet is stored;
   a discharge part including an outlet configured to discharge the stored condensate from the storage space; and
   a buoyant body including a closed part formed to be convex toward a vertically lower side such that the buoyant body is seated on the discharge part to close the outlet, a columnar support part extending vertically upwards from the closed part, and a weight formed of a material having a density that is higher than that of a material constituting the support part, at a lower end of the closed part.

2. The condensate trap apparatus of claim 1, wherein the closed part has a shape of a portion of a sphere, and
wherein the support part has an outer surface that is continuous from an outer surface of the closed part to have a cylindrical shape.

3. The condensate trap apparatus of claim 1, further comprising:
a separation preventing wall surrounding the buoyant body, disposed to be spaced apart from an outer surface of the buoyant body to define the storage space, and extending vertically upwards and downwards to prevent separation of the buoyant body.

4. The condensate trap apparatus of claim 3, wherein the separation preventing wall has a uniform height while surrounding the buoyant body such that an inside and an outside of the separation preventing wall are not communicated with each other along a direction that is perpendicular to a direction, in which the outlet is opened.

5. The condensate trap apparatus of claim 3, wherein the buoyant body further includes:
a guide wing protruding from an outer surface of the support part or the closed part toward an outside such that the support part is not inclined from a state, in which the support part is arranged along a vertical direction, and an outer end of the guide wing is disposed adjacent to the separation preventing wall.

6. The condensate trap apparatus of claim 5, wherein the guide wing extends along the vertical direction.

7. The condensate trap apparatus of claim 1, wherein the discharge part further includes:
an annular discharge packing surrounding the outlet, extending from an edge of the outlet to be inclined toward a radial outer side of the outlet and a vertically upper side such that an outer surface of the buoyant body contacts the discharge packing when the buoyant body is seated on the discharge part to close the outlet.

8. The condensate trap apparatus of claim 7, wherein the discharge packing has a dual structure including:
an annular first contact part disposed on an outermost side with respect to a radial direction of the outlet and contacting the closed part; and
an annular second contact part located to be spaced apart from the first contact part inwards, and contacting the closed part.

9. The condensate trap apparatus of claim 1, wherein the weight is inserted into the outlet when the buoyant body closes the outlet.

10. The condensate trap apparatus of claim 1, wherein the buoyant body further includes:
a head part disposed at an end of the support part and formed to be convex toward a vertically upper side.

11. The condensate trap apparatus of claim 1, wherein the discharge part further includes:
a first discharge space, in which the condensate discharged through the outlet is accommodated;
a second discharge space, in which the condensate delivered from the first discharge space is accommodated;
a drainage communicating the second discharge space and an outside such that the condensate accommodated in the second discharge space is discharged to the outside; and
a discharge partition wall provided with a condensate passage, through which the condensate flows from the first discharge space to the second discharge space, and configured to partition the first discharge space and the second discharge space, and
wherein the condensate passage is located on an upper side of the outlet with respect to a vertical direction.

12. The condensate trap apparatus of claim 11, wherein the drainage is located on the upper side of the outlet with respect to the vertical direction.

13. The condensate trap apparatus of claim 11, wherein the drainage is disposed to be adjacent to a bottom surface of the second discharge space, and
wherein the bottom surface of the second discharge space has a gradient such that a portion thereof that is adjacent to the drainage is located on a lowermost side with respect to the vertical direction.

14. The condensate trap apparatus of claim 11, further comprising:
an auxiliary line communicated with the second discharge space to deliver other water generated by a boiler that produces the condensate to the second discharge space, and
wherein a location, at which the auxiliary line is communicated with the second discharge space, is located on an upper side of the drainage with respect to the vertical direction.

15. A buoyant body seated on a discharge part including an outlet configured such that condensate stored in a storage space is discharged from the storage space, the buoyant body comprising:
a closed part formed to be convex toward a vertically lower side to be seated on the discharge part to close the outlet, and having a shape of a portion of a sphere;
a columnar support part extending from the closed part to a vertically upper side, and having an outer surface that is continuous to an outer surface of the closed part;
a head part disposed at an upper end of the support part and formed to be convex toward a vertically upper side; and
a weight formed of a material having a density that is higher than that of a material constituting the support part, at a lower end of the closed part.

* * * * *